UNITED STATES PATENT OFFICE.

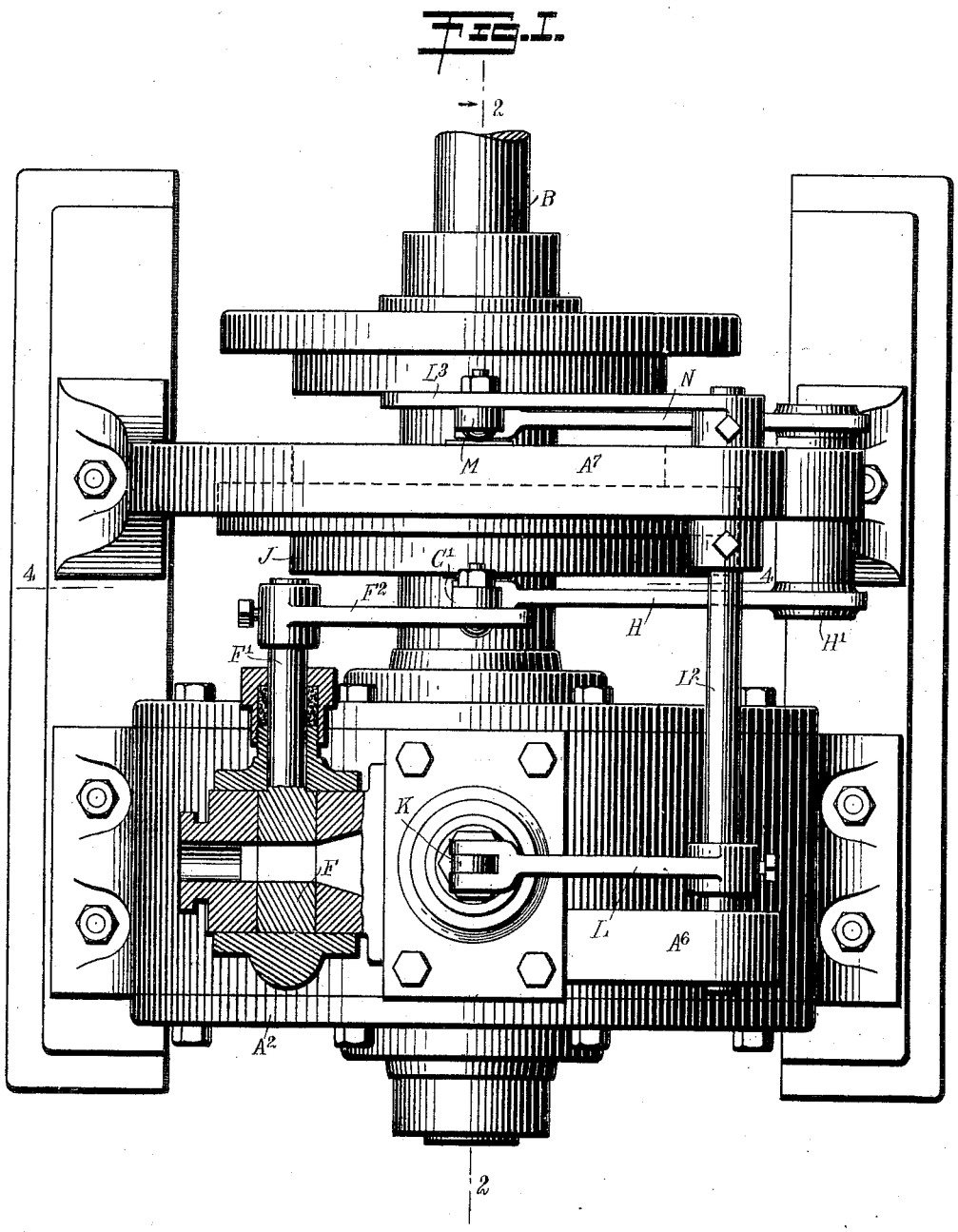

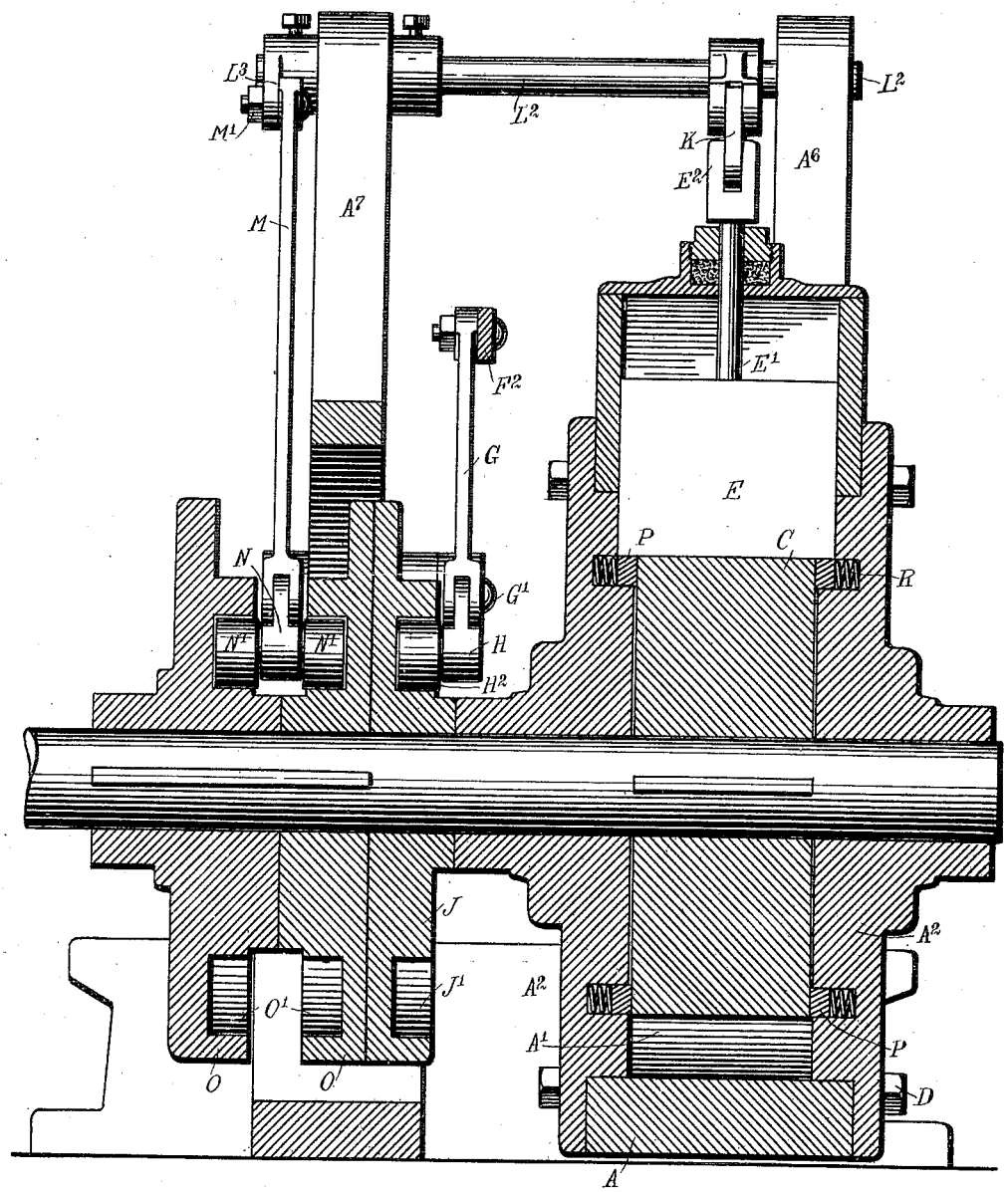

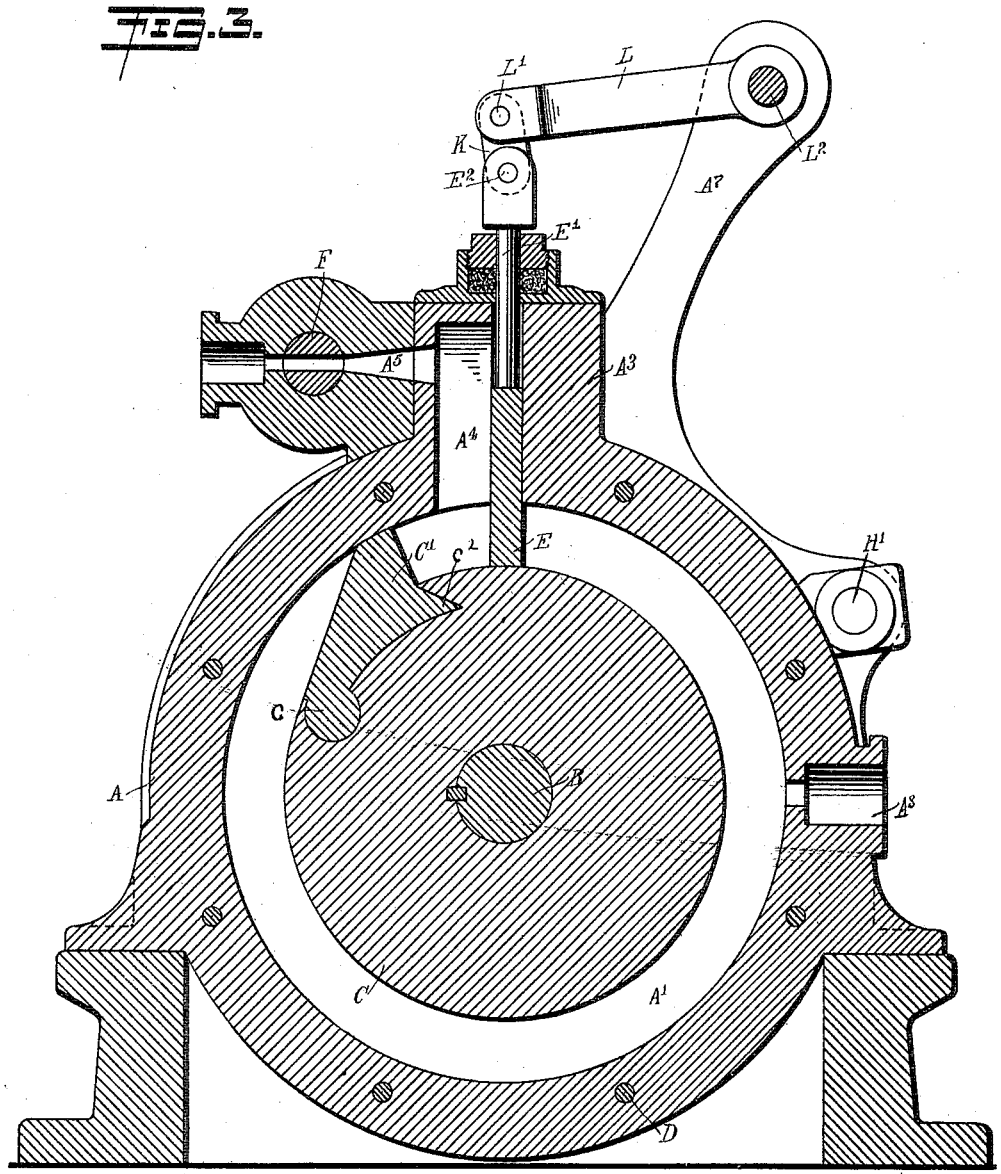

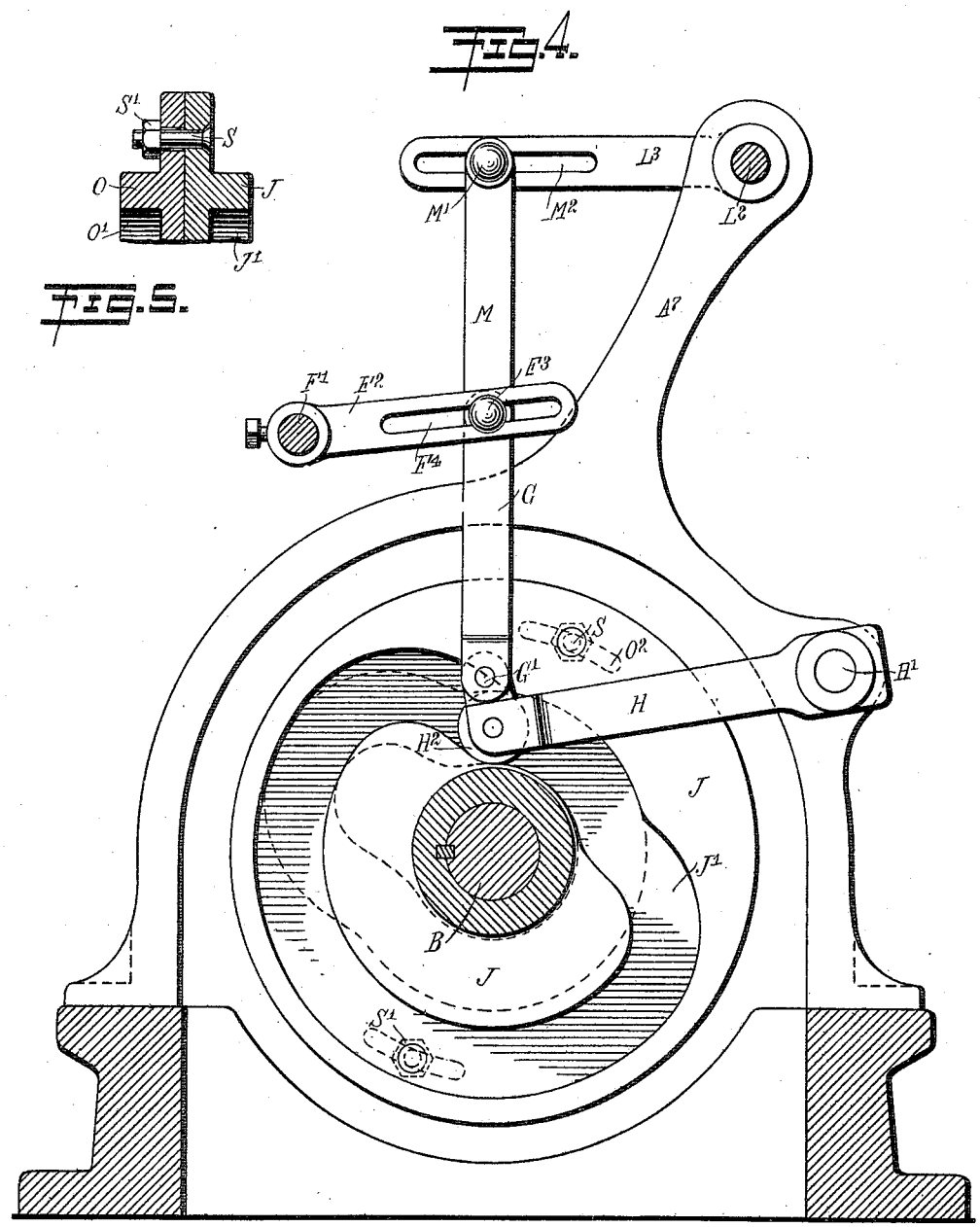

WILLIAM P. McMANNAMY AND JOHN P. JOHNSON, OF KALISPELL, MONTANA.

ROTARY ENGINE.

994,595.

Specification of Letters Patent. Patented June 6, 1911.

Application filed October 12, 1910. Serial No. 586,637.

*To all whom it may concern:*

Be it known that we, WILLIAM P. MCMANNAMY and JOHN P. JOHNSON, both citizens of the United States, and residents of Kalispell, in the county of Flathead and State of Montana, have invented new and useful Improvements in Rotary Engines, of which the following is a full, clear, and exact description.

Our invention relates to rotary engines, particularly for steam or other gaseous driving agents, and has for its object to provide an engine of this character, capable of working efficiently in any position, with especial provision of means to prevent or reduce the leakage of steam.

The novel features of the invention will appear from the description following hereinafter, and particularly from the appended claims.

Reference is to be had to the accompanying drawings forming a part of this specification, in which similar characters of reference indicate corresponding parts in all the figures.

Figure 1 is a plan view of a rotary engine embodying our invention, with parts in section; Fig. 2 is a vertical section on the line 2—2 of Fig. 1; Fig. 3 is a vertical section through the piston chamber, the plane of section being perpendicular to the piston shaft; Fig. 4 is a vertical section substantially on the line 4—4 of Fig. 1; and Fig. 5 is a detail, showing the adjustable connection of certain cam disks.

The annular body A surrounds a chamber A′, through which extends centrally the shaft B carrying a piston composed of a cylindrical portion C and a tangential outward extension C′ in contact with the cylindrical wall of the chamber A′. The side walls of the chamber are formed by heads $A^2$ which with the ring A form a casing or cylinder held together by bolts D or otherwise. The tangential extension C′ has a transverse cylindrical projection $c$ adjacent the inner end of the tangential surface, and the working face of the piston has a projecting transverse edge $c^2$. This projection and edge fit into corresponding recesses in the periphery of the piston C forming a steam tight joint, and at the same time allowing for the expansion and contraction of the piston.

The ring-shaped body A is made with an upward extension $A^3$ containing a chamber $A^4$ for the admission of steam and a radial slideway for the abutment E, engaging the piston C, C′. Steam (or some other driving agent) enters the chamber $A^4$ through a passage $A^5$ controlled by a rocking valve F, which also serves as a cut-off. On the stem F′ of the valve is secured an arm $F^2$ having an adjustable pivotal connection at $F^3$, $F^4$ with a link G, the lower end of which is pivotally connected at G′ with an angular lever H fulcrumed on the frame at H′. This lever carries a roller $H^2$ arranged to travel in a cam groove J′ of a disk J held to rotate with the shaft B by means of connections described hereinafter. As the shaft rotates, the valve F will be opened and closed alternately, the amount of the movement or throw being greater or less according as the connection $F^3$ is brought nearer to or farther away from the valve axis F′.

The abutment E is provided with a rod E′ extending through a suitable stuffing box and terminating in a fork $E^2$ pivotally connected with a link K having a like connection at L′ with an arm L, on a rock shaft $L^2$ journaled in brackets $A^6$, $A^7$ of the frame. Another arm $L^3$ rigidly secured to said rock shaft has an adjustable pivotal connection at M′, $M^2$ with a link M whose lower end is pivotally connected with an angular lever N fulcrumed on the frame at H′ and carrying rollers N′. The link M and lever N are similar to the link G and lever H, but instead of one roller the lever N carries two rollers N′ arranged to travel in two similar cam tracks O′ in disks O held to rotate with the shaft B. Of course, the lever N might be operated by a single cam disk.

The abutment E is wider than the piston C, C′ (see Fig. 2) so as to overlap it at each side, and the overlapping portions engage packing rings P contained in annular grooves of the heads $A^2$ and pressed inward, against the end faces of the pistons C, C′ by springs R. The outer peripheries of the packing rings are flush with the outer surface of the piston body C.

The disk J is rigidly secured to the shaft B, in which case the relative timing of the valve F and of the abutment E would always be the same. As a rule, however, we prefer to provide for adjustable timing, which may be accomplished by having one of the disks J, O adjustable relatively to the other circumferentially. Thus, as shown in Figs. 4 and 5, the disk O is loose on the shaft B and has segmental slots O² through which pass bolts S secured to the disk J to turn therewith about the shaft B, the parts being secured after adjustment by means of nuts S'.

The operation of the engine, being of the well known character, need not be described in detail. Steam enters through the chamber A⁴, passes between the abutment E and the piston extension C' and rotates the piston, escaping through the outlet A⁸ when the extension C' has cleared it. The cam disks O operate the abutment E and the cam disk J actuates the valve F. The stroke of the abutment can be adjusted by moving the pivot connection M' toward or from the rock shaft L². The throw of the valve F and the amount of steam admitted, can be adjusted in a similar manner, as previously explained. By adjusting the disk J relatively, to the disk O, the beginning and end of steam admission can be timed differently with reference to the movements of the abutment E, thus varying the length of the time during which the steam works expansively after the valve has been closed.

The improved engine will work equally well in any position. Two or more cylinders and pistons may be used, combined so that their working periods will alternate or overlap, so as to avoid dead centers. The construction of the piston of two separate parts C, C' will allow for expansion, and contraction. The packing rings P, instead of being spring-pressed, may be held against the piston by steam. These modifications and others may be made without departing from the nature of our invention as set forth in the appended claims.

Having thus described our invention, we claim as new and desire to secure by Letters Patent:

1. A rotary engine comprising a casing, a piston therein, a shaft connected with said piston, a movable abutment engaging said piston, means operated by said shaft for actuating the abutment at regular intervals, and means connecting the abutment with the actuating means, said connecting means being adjustable to vary the amount of throw of the abutment.

2. A rotary engine comprising a casing, a piston therein, a shaft for the piston, a movable abutment in the casing engaging the piston, a valve for the casing, a plurality of cams operated by the piston shaft, said cams being adjustably connected together, and connections to the abutment and the valve actuated by the cams.

3. An engine comprising an operating shaft, a plurality of cams mounted on the shaft, one of said cams being fixed to the shaft and the remaining cams being adjustably connected to the first cam, and movable mechanisms in said engine to be actuated by the said cams.

4. In an engine, a casing, a piston shaft mounted therein, a frame associated with the casing, a rock shaft and a lever mounted in the frame, said rock shaft terminating adjacent the lever and having an arm thereon, mechanisms separately connected to the arm and the lever to be operated thereby, and cam means located adjacent the said lever and rock arm and actuated by the shaft to operate the lever and the rock shaft.

5. In a rotary engine, the combination of a casing, a piston therein comprising a cylindrical central part, a part mounted on the central part having a working face, said part also having a transverse cylindrical projection and a transverse projecting edge fitting into corresponding recesses in the central part to form a steam-tight joint, and means for controlling the piston in its movement.

6. A rotary engine, comprising a casing, a piston mounted to turn therein, a movable abutment engaging said piston, a rock shaft operatively connected with said abutment, means for admitting the driving agent, and an actuating connection between the piston and the rock shaft, said connection including means adjustable toward and from the rock shaft to vary its throw.

7. In a steam engine, the combination of a casing, a piston therein, a valve for the casing, a slotted lever connected to the valve, a rod adjustably connected to the slotted lever to vary the amount of throw of the valve, an adjustable cam operated from the piston to actuate the rod, the adjustment of the cam serving to time the actuation of the valve, an abutment coöperating with the piston, a slotted lever connected to the abutment, a second rod adjustably connected to the abutment lever to vary the amount of throw of the same, and means for operating the second rod.

In testimony whereof we have signed our names to this specification in the presence of two subscribing witnesses.

WILLIAM P. McMANNAMY.
JOHN P. JOHNSON.

Witnesses:
T. A. THOMPSON,
W. H. GRIFFIN.

Copies of this patent may be obtained for five cents each, by addressing the "Commissioner of Patents, Washington, D. C."